United States Patent [19]

Kato

[11] Patent Number: 4,881,828
[45] Date of Patent: Nov. 21, 1989

[54] ROLLING CONTACT DEVICE

[75] Inventor: Heizaburo Kato, Shizuoka, Japan

[73] Assignee: Sankyo Manufacturing Company, Ltd., Tokyo, Japan

[21] Appl. No.: 331,127

[22] Filed: Mar. 31, 1989

[30] Foreign Application Priority Data

Mar. 31, 1988 [JP] Japan ................. 63-43329[U]

[51] Int. Cl.⁴ ............... F16C 21/00; F16C 19/52; F16C 41/04
[52] U.S. Cl. .................... 384/127; 74/569; 384/58; 384/449; 384/624
[58] Field of Search ............. 384/50, 55, 58, 126, 384/127, 449, 515, 543, 546, 549, 564, 569, 586, 587, 624, 102; 74/569

[56] References Cited

U.S. PATENT DOCUMENTS

| 1,946,652 | 2/1934 | Wallgren | 384/127 |
| 2,643,162 | 6/1953 | Barr | 384/58 |
| 3,393,022 | 7/1968 | Alven et al. | 384/127 |
| 3,596,533 | 8/1971 | Nightingale | 384/127 X |
| 4,106,826 | 8/1978 | Marola | 74/569 X |
| 4,113,327 | 9/1978 | Koch | 74/569 X |
| 4,623,269 | 11/1986 | Burg | 384/624 X |

FOREIGN PATENT DOCUMENTS 54-20534  7/1979  Japan .

Primary Examiner—Thomas R. Hannon
Attorney, Agent, or Firm—Pollock, Vande Sande & Priddy

[57] ABSTRACT

A rolling contact device having a shaft adapted to be secured to an element of an apparatus, an outer ring adapted to be in contact with another element of the apparatus, and rolling elements disposed between the shaft and the outer ring. The contact device has a projection mounted on or integrated with the shaft. The projection is so arranged that, when an excessive radial load is applied to the outer ring from the above-mentioned another element, the projection is brought into contact with the another element and reduces the load acting on contact portions among the rolling elements, the outer ring and the shaft.

5 Claims, 3 Drawing Sheets

ROLLING CONTACT DEVICE

BACKGROUND OF THE INVENTION

1. Field of the Invention

The present invention relates to a rolling contact device such as a cam follower used in the technical field of machine tool or the like, and more particularly to a rolling contact device which comprises a shaft having an outer track surface, an outer ring surrounding the shaft and having an inner track surface, and rolling elements disposed between the shaft and the outer ring in a relationship spaced apart from each other circumferentially of the shaft, the outer peripheral surface of the outer ring being adapted to be in rolling contact with a track surface of an element of equipment or apparatus.

2. Description of the Prior Arts

Heretofore, there is known a rolling contact device of the above-mentioned type, in which one end of the shaft is secured to an element of a machine and the peripheral surface of the outer ring is made in rolling contact with a cam surface of a cam for serving as a cam follower. Such a cam follower is disclosed, for example, in Japanese Patent Publication No. 54-20534. The rolling contact device of this type is also used for moving a machine element together with the rolling contact device along a guiding rail with one end of the shaft sucured to the machine element and with the peripheral surface of the outer ring in rolling contact with the rail.

The above-mentioned rolling contact device of prior art suffers from a problem that when a radial load greater than a certain value, such as an impact load, is applied to the outer ring permanent deformations or press traces occur on the contact portions among the track surface of the shaft, the rolling elements and the track surface of the outer ring, thereby deteriorating the precision of the device, and in case the load is excessive, failures of the device including permanent deformation or bending of the shaft may occur.

SUMMARY OF THE INVENTION

The object of the present invention is to solve the above-mentioned problem of the prior art, and to provide a rolling contact device involving little risk of producing press traces at contact portions or permanent bending of the shaft.

For achieving the object, the rolling contact device according to the present invention comprises a projection mounted on or integrated with the shaft, which includes a load supporting portion opposite to a track surface of an element of an equipment or an apparatus with small gaps defined therebetween, whereby when a radial load greater than a predetermined value acts on the outer ring, the track surface of the equipment abuts on the load supporting portion. In consequence, even if an excessive load acts on the outer ring, the load acting on the contact portions among the rolling elements and the tracks of the outer ring and the shaft is maintained rather low, resulting in an increased allowable load without causing any permanent deformation of the shaft.

DETAILED DESCRIPTION OF THE PREFERRED EMBODIMENTS

Figure 1:
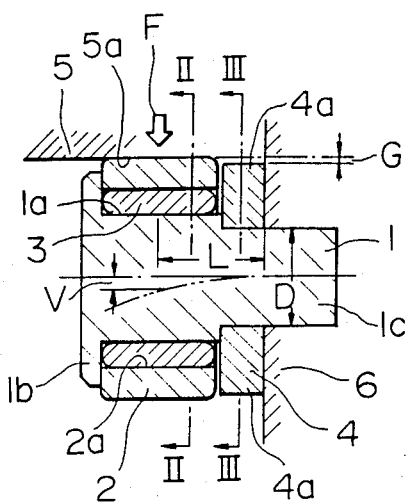
FIG. 1 is a cross sectional view of a rolling contact device according to an embodiment of the present invention.
Figure 3:
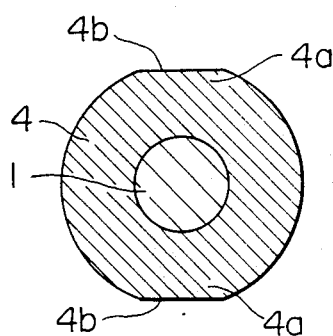
FIG. 3 is a cross-sectional view taken on line III—III of FIG. 1.
Figure 2:
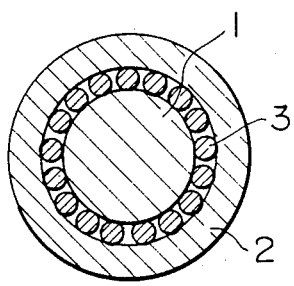
FIG. 2 is a cross-sectional view taken on line II—II of FIG. 1.

FIGS. 1, 2 and 3 show a rolling contact device according to the first embodiment of the present invention.

The rolling contact device comprises a shaft 1 having an outer track surface 1a, an outer ring 2 surrounding the shaft 1 and having an inner track surface 2a, and rolling elements 3 arranged between the shaft 1 and the outer ring 2 in rolling contact with the track surface 1a of the shaft 1 and the track surface 2a of the outer ring 2, and the outer peripheral surface of the outer ring 2 is in rolling contact with a track surface of an equipment or an apparatus, i.e. with a cam surface 5a of a cam 5 in the illustrated embodiment. The rolling elements 3 are composed of needle rollers arranged in a relationship spaced apart from each other circumferentially of the shaft 1. The shaft 1 is integrally formed with a flange 1b at its left end for preventing the outer ring 2 from moving to the left and slipping out from the shaft 1. Right end portion 1c of the shaft 1 is fitted into an element 6 of the equipment or the apparatus and secured thereto.

A projection 4 located axially adjacent to the right end of the track surface 1a (FIG. 1) includes a load supporting portion 4a at its peripheral portion, which is radially opposed to the cam surface 5a with a small gap G defined therebetween. The projection 4 is constituted by an annular member fitted on and fixed to the shaft 1. When a radial load F greater than a predetermined value acts on the outer ring 2, the load supporting portion 4a abuts on the cam surface 5a, thereby decreasing a load acting on contact portions among the track surface 2a of the outer ring 2, the rolling elements 3 and the track surface 2a of the shaft 1. As shown in FIG. 3, the load supporting portion 4a has flat surfaces 4b. These flat surfaces 4b are opposed to flat portions of cam surface 5a, so as to enable the surfaces 4b to preferably abut on the cam surface 5a. However, the projection may have a circular cross-section without forming any flat surface such as flat surface 4b. In the illustrated embodiment, flat surfaces 4b are provided at both upper and lower portions of the projection 4 in consideration of the fact that the cam 5 may be located at the lower side of the rolling contact device as viewed in FIG. 1.

If a rolling contact device does not have the projection 4, the relation among a radial elastic deformation $\delta$ (mm) of the outer ring 2, maximum load Qm (kgf) acting on the rolling element, and an effective length La (mm) of the rolling element 3 is expressed by the following equation:

$$\delta = 0.0006 \frac{Qm^{0.9}}{La^{0.8}} \quad (1)$$

Assuming that a radial load corresponding to the basic static nominal load Co (kgf) of the device acts on the outer ring 2, the maximum load Qm on each rolling element 3 can be calculated by the following equation (2), in which Z designates the number of the rolling element 3. In such a rolling contact device or bearing under an usual operation, it is experimentally recognized that a deformation of a rolling element or a roller smaller than 1/10,000 of the rolling element diameter is permitted without causing any operational trouble. Accordingly, a static load causing such permanent deformation is referred to as a basic static nominal load.

$$Qm = \frac{4.08}{Z} Co \quad (2)$$

When a radial force F (kgf) acts on the outer ring 2, the resulted bending deformation V (mm) of shaft 1 is expressed by the following equation (3), in which E, D and L designate Young's modulus (kgf/mm$^2$), the diameter (mm) of the right portion 1c of shaft 1 which is supported by the element 6, and the length (mm) between the left end of the right portion 1c of the shaft 1 and the acting point of load F, respectively.

$$V = \frac{64FL^3}{3\pi ED^4} \quad (3)$$

The elastic deformation $\delta$ of the outer ring 2 deduced from the equations (1) and (2) is based on the assumption that no projection 4 is provided and a basic static nominal load Co is applied. The bending deformation V resulted from a radial load acting on the outer ring 2, which is equal to the basic static nominal load, is calculated from the equation (3). When the basic static nominal load acts on the outer ring from the cam 5, the outer ring 2 deforms downwardly by an amount of the sum of elastic deformation $\delta$ and bending deformation V, i.e. $\delta + V$. In consequence, the above-mentioned gap G is preferred to be below the deformation amount $\delta + V$. In this configuration, when a load greater than the basic static nominal load is applied, the cam surface 5c is necessarily in contact with the load supporting portion 4a, thereby decreasing the load acting on rolling contact portions.

Exactly speaking, the bending deformation V of the shaft 1 at the radial load acting point is different from the shaft deformation at the position of the projection 4. However, sufficient effects can be obtained by simply defining the gap G below the value $\delta + V$ as mentioned above, because the above-mentioned difference between the exact deformation and the approximate one is very small, and even if the gap is a little larger than a proper value, the cam surface 5a abuts to load supporting portion 4a through a thin lubricant film and hence the load acting on the rolling contact portions is decreased.

In actual operation of the device, it is desired for the cam surface 5a to slide along the load supporting portion 4a with a lubricant oil existing in the gap G, as similar to the case of a plane bearing. For realizing this feature, the amount of the gap G is preferred to be a little greater than the sum of the elastic deformation of the outer ring caused when maximum radial load (design load) is applied thereto in an usual operation of the device and the allowable minimum thickness of lubricant oil film for effecting a fluid lubrication.

Figure 4:
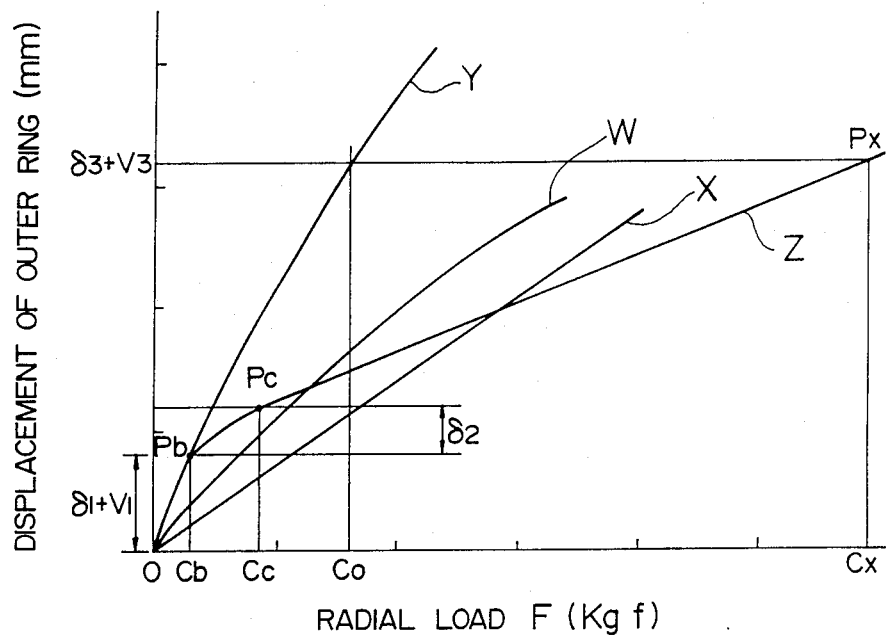
FIG. 4 shows functions of rolling contact devices.

FIG. 4 shows a relation between a radial load F (kgf) acting on the rolling elements and an outer ring deformation 8 (mm). In the figure, line W and line X show theoretical characteristics of a device of a prior art which has not any projection such as projection 4. Line W shows a relation between radial elastic deformation $\delta$ of the outer ring and a magnitude of radial load, while line X shows a relation between bending deformation (V) of the shaft and magnitude of radial load. Line Y shows a relation between total deformation of the rolling contact device of the above-mentioned prior art, i.e. the sum of the outer ring elastic deformation (indicated by line W) and the shaft bending deformation (indicated by line X), and magnitude of radial load. Line Z shows an example of a characteristic of the rolling contact device according to the illustrated embodiment of the invention, where the size or depth of gap G is made equal to the sum of the outer ring maximum elastic deformation $\delta_1$ resulted from maximum radial load applied to the outer ring 2 during usual operation, the outer ring displacement $V_1$ caused by shaft bending deformation, and minimum allowable thickness $\delta_2$ of lubricant oil, i.e. $\delta_1 + V_1 + \delta_2$.

As obvious from line Y in FIG. 4, in the prior art, the total deformation of the outer ring increases substantially in proportion to the increase of the radial load, and reaches $\delta_3 + V_3$ when a radial load corresponding to the basic static nominal load Co acts on the outer ring. In a usual operation, i.e. in a radial load range below point Cb which corresponds to the outer ring total displacement $\delta_1 + V_1$, line Y coincides with line Z, in other words, the function of the device of the present invention is identical to that of the device of the prior art. In the range between point Pb and point Pc at which the total displacement of the outer ring reaches the value $\delta_1 + V_1 + \delta_2$, the gap G gradually decreases from the allowable minimum thickness of the lubricant oil film. In this range, since the cam surface 5a abuts on the load supporting portion 4a with oil film interposed therebetween, the total displacement of the outer ring increases along a gentle slope as the load increases (see line 2). When the radial load reaches Cc corresponding to point Pc, the cam surface directly contacts with the load supporting portion 4a with no oil film therebetween. When the radial load further increases beyond point Cc, the total displacement of the outer ring linearly increases along a slope gentler than the above-mentioned slope between point 0 and point Pb due to the greater stiffness of the rolling contact device. In consequence, the basic static nominal load corresponding to the outer ring total displacement $\delta_3 + V_3$ is Co in the prior art as will be understood from line Y, while in the illustrated embodiment as indicated by line Z, it is Cx which is considerably greater than Co.

As mentioned above, since the outer ring total displacement reaches $\delta_3 + V_3$ only when a greater load Cx is applied on the ring, permanent deformations of the rolling contact portions and permanent deformation of the shaft assumed to be caused by an impact load can be effectively prevented.

Referring to line Z, in the range from Pb to Pc, the oil film gradually becomes thinner with an increasing frictional force accompanied, while in the range from Pc to Px, the cam surface 5a directly abuts on the load supporting portion 4a with no oil film therebetween, making it difficult for the cam surface to move relative to the load supporting portion. Therefore, when a radial load greater than Cb, particularly the load greater than Cc, is applied on the outer ring which is in a rotating state, the rotation of the ring may be abruptly stopped in an inconvenient manner. Consequently, it may be said that the rolling contact device of the present invention is most suitable to be used for a device suffering an impact load which may be applied in a stationary state of the device. For example, the rolling contact device of the invention may be used in an intermittent index device which transforms a continuous rotary motion of an input shaft to an intermittent rotary motion of an output shaft through a cam and rolling contact devices. In this case, there is the possibility that a greater radial impact load may be applied to the outer rings of the rolling contact devices during the intermittent period for which the output shaft and hence the outer rings are in a stationary state, but no permanent deformation of the rolling contact portions or no permanent bending of the shaft may be caused by the impact load.

Figure 5:
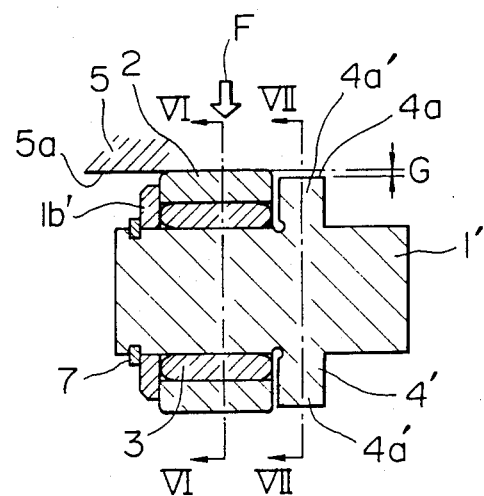
FIG. 5 is a cross-sectional view of a rolling contact device according to a second embodiment of the present invention.
Figure 7:
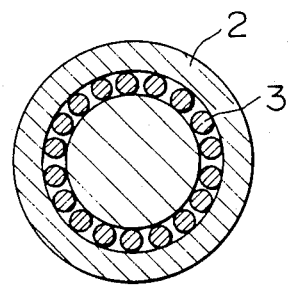
FIG. 7 is a cross sectional view taken on line VII—VII of FIG. 5.
Figure 6:
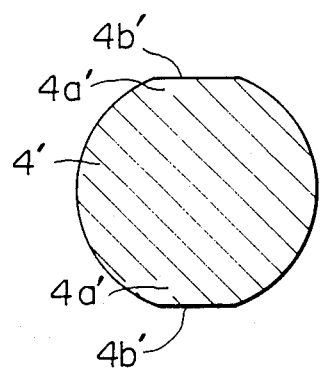
FIG. 6 is a cross-sectional view taken on line VI—VI of FIG. 5.

FIGS. 5 to 7 show a second embodiment of the present invention. The rolling contact device according to this embodiment includes a projection 4' which is similar to the projection 4 in the first embodiment, but is formed integral with a shaft 1', thereby making the projection 4' stiffer than the projection 4. On the other hand, there is provided a separate support member 1b' which corresponds to the flange 1b in the first embodiment. The support member 1b' is fitted on the left end portion of the shaft 1' and fixed to the shaft 1' by means of a stop ring 7. The support member 1b' is fitted and fixed after the rolling elements 3 and the outer ring 2 have been mounted on the shaft 1', thereby preventing the rolling elements 3 and the outer ring 2 from slipping out from the shaft 1'.

Other features of the second embodiment are similar to those of the first embodiment. Namely, the projection 4' comprises a load supporting portion 4a' which is opposite to the cam surface 5a of the cam 5 with a small gap C defined therebetween, and is adapted to abut against the cam surface 5a when a radial load F greater than a predetermined value acts on the outer ring 2. The load supporting portion 4a' has, as shown in FIG. 7, flat surfaces 4b' at its upper and lower portions. The size or amount of the gap G may be determined similarly to that of the first embodiment.

As mentioned above, the rolling contact device of the present invention brings about such advantage as to decrease the probability of permanent deformations of the device at its rolling contact portions or at its shaft, when an impact load or the like acts on the outer ring of the device.

What is claimed is:

1. A rolling contact device comprising:
   a shaft having an outer track surface;
   an outer ring surrounding said shaft and having an inner track surface;
   rolling elements disposed between said shaft and said outer ring in a relationship spaced apart from each other circumferentially of said shaft, the outer peripheral surface of said outer ring being adapted to be in rolling contact with a track surface of an element of an apparatus; and
   a projection provided on said shaft and having a load supporting portion opposing to said track surface of said element with a small gap defined therebetween;
   said projection being arranged such that, when a radial load greater than a predetermined value acts on said outer ring, said track surface of said element may abut on said load supporting portion of said projection.

2. A rolling contact device as claimed in claim 1, wherein said projection is an annular member fitted on said shaft.

3. A rolling contact device as claimed in claim 1, wherein said projection is an annular member formed integral with said shaft.

4. A rolling contact device as claimed in claim 1, wherein said load supporting portion is located at a periphery of said projection, and includes flat surfaces opposite to flat surfaces of said element.

5. A rolling contact device as claimed in claim 1, wherein said gap is greater than the sum of a radial elastic deformation of said outer ring caused by a maximum radial load applied to the latter during an usual operation of the device and an allowable minimum thickness of a lubricant oil film existing between said track surface of said element and said load supporting portion of said projection, and said gap is smaller than the sum of a radial elastic deformation of said outer ring and a displacement of said outer ring due to bending of said shaft, the values of the latter elastic deformation and displacement of said outer ring corresponding to those attainable under assumption that said projection is not provided and a basic static nominal load is applied to said outer ring.

* * * * *